United States Patent
Lopez et al.

(10) Patent No.: US 9,287,947 B2
(45) Date of Patent: Mar. 15, 2016

(54) METHOD AND DEVICE FOR ADAPTIVE PRE-CODING

(71) Applicant: Telefonaktiebolaget L M Ericsson (publ), Stockholm (SE)

(72) Inventors: Miguel Lopez, Solna (SE); Henrik Sahlin, Mölnlycke (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/000,410

(22) PCT Filed: Jul. 8, 2013

(86) PCT No.: PCT/SE2013/050876
§ 371 (c)(1),
(2) Date: Feb. 3, 2014

(87) PCT Pub. No.: WO2014/031058
PCT Pub. Date: Feb. 27, 2014

(65) Prior Publication Data
US 2014/0140427 A1   May 22, 2014

Related U.S. Application Data

(60) Provisional application No. 61/684,875, filed on Aug. 20, 2012.

(51) Int. Cl.
*H04B 7/04* (2006.01)
*H04L 1/16* (2006.01)
*H04L 1/18* (2006.01)
*H04L 1/08* (2006.01)
*H04B 7/06* (2006.01)

(52) U.S. Cl.
CPC ............ *H04B 7/0456* (2013.01); *H04B 7/0413* (2013.01); *H04B 7/0689* (2013.01); *H04L 1/08* (2013.01); *H04L 1/1607* (2013.01); *H04L 1/189* (2013.01)

(58) Field of Classification Search
None
See application file for complete search history.

(56) References Cited

U.S. PATENT DOCUMENTS

| | | | |
|---|---|---|---|
| 2008/0019310 A1 | 1/2008 | Sebire et al. | |
| 2008/0267157 A1* | 10/2008 | Lee et al. | 370/342 |
| 2010/0074119 A1 | 3/2010 | Krishnaswamy | |
| 2010/0189192 A1* | 7/2010 | Miyoshi et al. | 375/300 |
| 2011/0007697 A1* | 1/2011 | Ryu et al. | 370/329 |
| 2012/0014349 A1* | 1/2012 | Chung et al. | 370/329 |

OTHER PUBLICATIONS

International Search Report and Written Opinion for PCT/SE2013/050876, mailed Oct. 17, 2013, 10 pages.

(Continued)

*Primary Examiner* — Leon-Viet Nguyen
(74) *Attorney, Agent, or Firm* — Patent Portfolio Builders, PLLC

(57) ABSTRACT

A network node which supports EGPRS, the network node being arranged to transmit RLC data blocks to at least one other network node in the EGPRS system and to receive acknowledgments from the other network node for successfully received RLC data blocks. The network node is also arranged to make pre-emptive retransmissions of unacknowledged previously transmitted RLC data blocks, and to make its transmissions with or without precoding. The network node is arranged to use precoding for a first percentage of the pre-emptive retransmissions and for a second percentage of the transmissions of RLC data blocks that have not been transmitted previously.

17 Claims, 11 Drawing Sheets

(56) References Cited

OTHER PUBLICATIONS

Author Unknown, "3GPP TS 45.002: Multiplexing and Multiple Access on the Radio Path (Release 10)," 3rd Generation Partnership Project (3GPP):Technical Sepcifications Group GSM/EDGE Radio Access Network, Mar. 2012, vol. 10.3.0, 112 pages.

Author Unknown, "MIMO Concepts for EGPRS," 3GPP TSG Geran #54, Agenda Items 6.1, 7.1.5.4, Nokia Siemens Networks, May 14-18, 2012, 7 pages, Sanya, P.R. China.

Dahlman, Erik et al., "Chapter 10: Downlink Physical-Layer Processing," 4G: LTE/LTE-Advanced for Mobile Broadband, Published: May 10, 2011, pp. 155-157, 167-168, Academic Press/Elsevier.

Plicanic, Vanja et al., "Performance of Handheld MIMO Terminals in Noise- and Interference-Limited Urbdan Macrocellular Scenarios," IEEE Transactions on Antenna and Propagation, Aug. 2012, vol. 60, No. 8, 12 pages.

\* cited by examiner

METHOD AND DEVICE FOR ADAPTIVE PRE-CODING

This application is a 35 U.S.C. §371 national phase filing of International Application No. PCT/SE2013/050876, filed Jul. 8, 2013, the disclosure of which is incorporated herein by reference in its entirety.

BACKGROUND

In EGPRS systems (including "derivatives" such as EGPRS2), the use of so called MIMO (Multiple Input, Multiple Output) technology has now been introduced. In systems that support MIMO, multiple data streams (also sometimes referred to as "layers") are transmitted simultaneously between a transmitting party and a receiving party. Usually, a plurality of transmit antennas are used, and each data stream is transmitted from one or more of the transmit antennas. Each data stream can also be given a so called weight factor, so called pre-coding of the data streams. Often, the pre-coding is based on a so called codebook, i.e. a list of the pre-coding weights used.

Pre-coding of the data streams will give the best SNR (Signal to Noise Ratio) in the receiver, but a MIMO transmitter will usually make some non-precoded transmissions as well, since non-precoded transmissions allow the receiver to estimate an optimal pre-coder or optimal pre-coding weights, which the transmitter can then use for future transmissions.

Thus, in a system which supports EGPRS MIMO which can use precoding it is desirable to use as many precoded transmissions as possible in order to obtain the highest SNR possible, while it at the same time is desirable to use as many non-precoded transmissions as possible in order to obtain an optimal estimate of the pre-coder. As can be seen, these two desires conflict.

An EGPRS system can use transmissions of dummy blocks (i.e. blocks which contain no payload) over a Temporary Block Flow, a TBF, in order to keep the TBF alive. In addition, in EGPRS, so called preemptive retransmissions of RLC data blocks can be used when a transmitter has transmitted unacknowledged data and there is nothing else to schedule for transmission. In this case, transmission of a payload is repeated, even though it is not known whether or not a previous transmission of the same payload was successfully received or not.

SUMMARY

It is an object to obviate at least some of the above disadvantages and to provide improved pre-coding in a network node which supports EGPRS with precoding.

This object is obtained by means of a network node which supports EGPRS. The network node is arranged to transmit RLC data blocks to at least one other network node in the EGPRS system and to receive acknowledgments from the other network node for successfully received RLC data blocks. The network node is also arranged to make pre-emptive retransmissions of unacknowledged previously transmitted RLC data blocks, and the network node is arranged to make its transmissions with or without precoding.

The network node is arranged to use precoding for a first percentage of the pre-emptive retransmissions and for a second percentage of the transmissions of RLC data blocks that have not been transmitted previously.

It should be pointed out that the first and second percentages can be equal, and that the first percentage can also be larger or smaller than the second percentage.

In embodiments, the network node is further arranged to also transmit dummy blocks to said at least one other node, and the network node is arranged to use precoding for the transmission of a certain percentage of the dummy blocks.

In embodiments of the network node, the third predefined percentage is zero.

The RLC data blocks are carried by (i.e. transported) in so called radio blocks, which are transmitted in a number of bursts, at present four bursts to each radio block. Suitably, the percentages mentioned here are percentages as averaged over a large number of bursts, i.e. hundreds or even thousands of bursts.

The above stated object is also obtained by means of a network node which supports EGPRS, and which is arranged to receive RLC data blocks transmitted from another network node in the EGPRS system as pre-coded and/or non-precoded transmissions, and to detect if a successfully received RLC data block, at least part of which is received in a non-precoded transmission has been received successfully previously, and if that is the case, to use all or parts of the RLC data block in order to perform a pre-coder estimate.

In embodiments, the network node is further arranged to receive and detect dummy blocks transmitted by means of precoded and/or non-precoded transmissions from the other network node, and to use dummy blocks received in non-precoded transmissions in order to perform pre-coder estimates.

In embodiments, the network node is arranged to recognize if a dummy block or at least a part of an RLC data block has been received in a precoded or a non-precoded transmission from the other network node by means of having received from the other network node a pattern indicating when transmissions will be made precoded and/or non-precoded.

In embodiments, the network node is arranged to recognize if a dummy block or at least a part of an RLC data block has been received in a precoded or a non-precoded transmission from the other network node by means of being arranged to recognize training-sequences that are used for precoded and/or for non-precoded transmissions.

Above, two network nodes have been described within one and the same general inventive concept. It should be pointed out that the term "a network node which supports EGPRS" is here used to refer to a network node which supports EGPRS as well as its derivatives, e.g. EGPRS2. In addition, the term "network node" is used above since the technical features described above (and in the following, except where explicitly stated otherwise) can be used in several kinds of network nodes, e.g. both a Mobile Terminal and a Radio Base Station.

The object is also obtained by means of a method for operating a network node which supports EGPRS and which is arranged to transmit RLC data blocks to at least one other network node in the EGPRS system and to receive acknowledgments from the other network node for successfully received RLC data blocks. The method comprises checking if an RLC data block for transmission has been transmitted previously or has been transmitted previously but hasn't been acknowledged, and transmitting RLC data blocks which have not been transmitted previously with a first likelihood for precoding, and transmitting RLC data blocks which have been transmitted previously but have not been acknowledged as pre-emptive transmissions, with a second likelihood for precoding.

In embodiments, the method further comprises also transmitting dummy blocks to said at least one other node, and using precoding with a third likelihood for the transmission of the dummy blocks.

In embodiments of the method, the predefined percentage is zero.

In embodiments of the method, the RLC data blocks are transmitted in radio blocks of a certain number of bursts, and the first and second likelihoods are applied to the transmission of the bursts.

The object is also obtained by means of a method for operating a network node which supports EGPRS. The method comprises receiving RLC data blocks from another network node in the EGPRS system as pre-coded and/or non-precoded transmissions, and detecting if a successfully received RLC data block, at least part of which is received in a non-precoded transmission, has been received successfully previously, and if that is the case, performing a pre-coder estimate using all or parts of the RLC data block.

In embodiments, the method further comprises receiving and detecting dummy blocks transmitted by means of pre-coded and/or non-precoded transmissions from the other network node, and performing pre-coder estimates by means of dummy blocks received in non-precoded transmissions.

In embodiments, the method comprises recognizing if a dummy block or all or parts of an RLC data block has been received in a precoded transmission from the other network node by means of having received (11, 12) from the other network node a pattern indicating when transmissions will be made precoded and/or non-precoded.

In embodiments, the method comprises recognizing if a dummy block or a RLC data block has been received in a precoded or a non-precoded transmission from the other network node by means of recognizing training-sequences that are used for precoded and/or for non-precoded transmissions.

BRIEF DESCRIPTION OF THE DRAWINGS

The invention will be described in more detail in the following, with reference to the appended drawings, in which.

DETAILED DESCRIPTION

Figure 1:
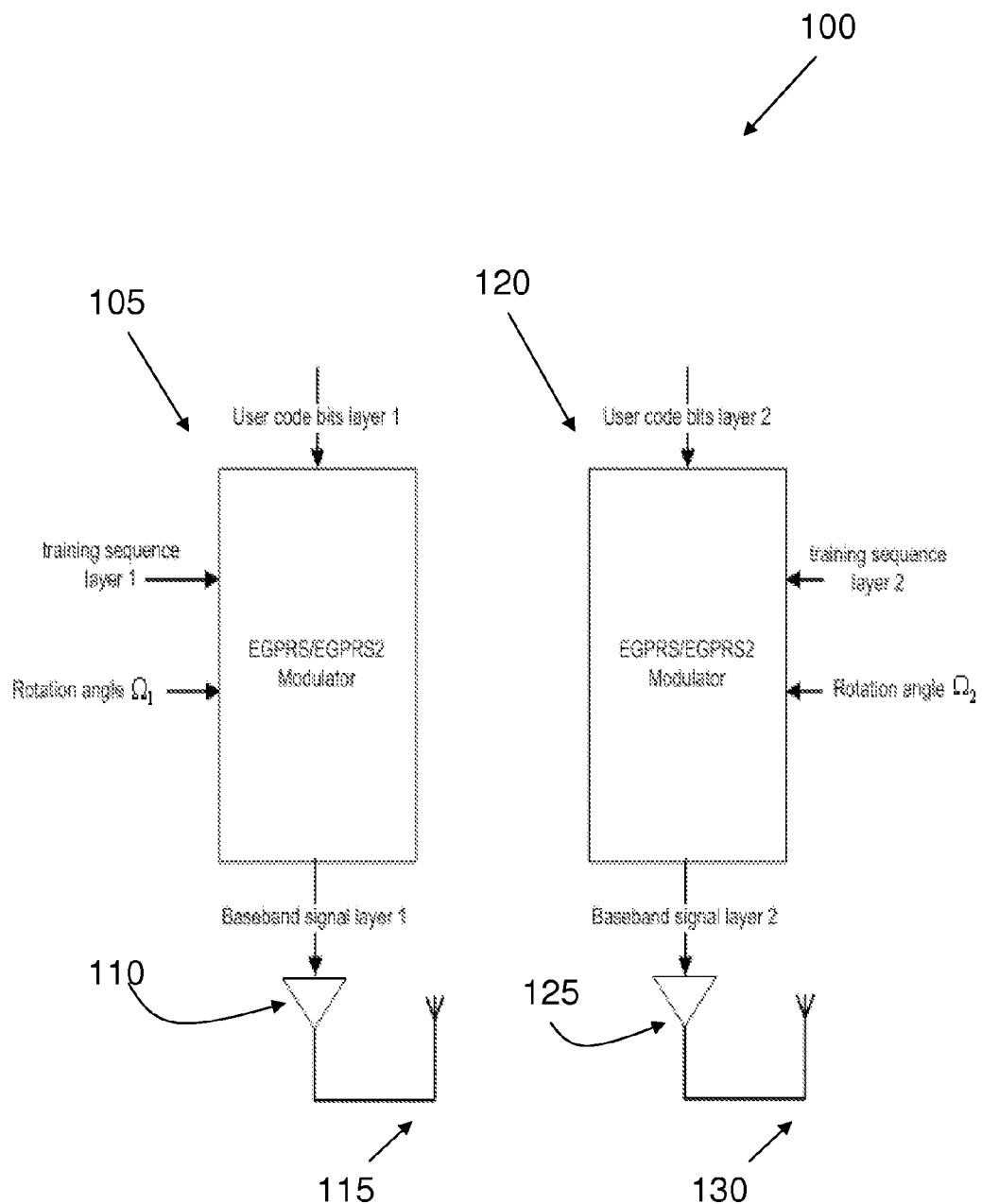
FIG. 1 shows a transmitter for MIMO EGPRS/EGPRS2.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

In EGPRS/EGPRS2 different radio block structures exist. One radio block consists of 4 bursts, and it may carry RLC/MAC (Radio Link Control/Medium Access Control) control blocks or RLC data blocks. The number of RLC data blocks carried in each radio block depends on the MCS (Modulation and Coding Scheme).

Initially, a basic MIMO EGPRS/EGPRS2 transmitter 100 will briefly be described with reference to FIG. 1. As shown, the transmitter 100 comprises two separate modulators 105, 120. Each modulator is fed a data stream, data stream 1 and data stream 2, respectively, which may be the same or different data streams. In order to form a so called "burst" for transmission, a number of other data, among them a so called training sequence is inserted together with data from the data stream, usually in the middle of the burst which is to be formed for transmission. The bursts are then modulated in the modulators 105, 120, and transmitted via respective antennas 115, 130. As shown in FIG. 1, before the antennas, there may be placed transmit amplifiers 110, 125. In addition, each burst may be rotated by an angle $\Omega_1$, $\Omega_2$, in connection to the modulation, so that each data stream can be transmitted with different rotation angles $\Omega_1$, $\Omega_2$.

Figure 2:
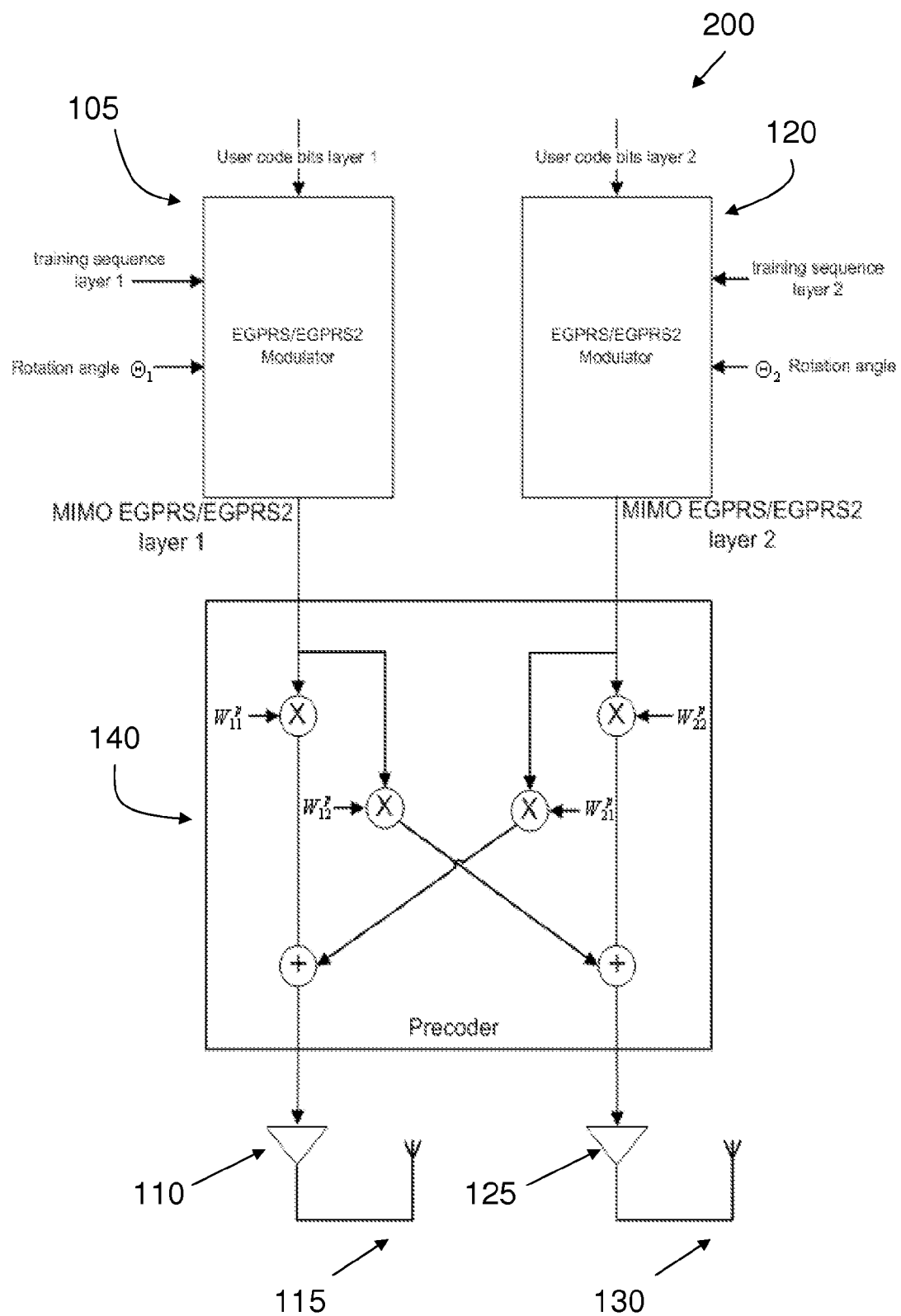
FIG. 2 shows a transmitter for precoded MIMO EGPRS/EGPRS2.

FIG. 2 shows another embodiment 200 of a MIMO/EGPRS transmitter. As compared to the embodiment 100 of FIG. 1, the embodiment 200 also comprises a precoding network 140. The role of the precoding network, as the name implies, is to apply precoding weights to the two data streams, prior to the transmission of bursts formed from each data stream from each of the two antennas 115, 130. Thus, as opposed to the embodiment 100 of FIG. 1, in the embodiment 200, bursts formed from each data stream is transmitted from each antenna, with a precoding weight applied to it. As can be seen in FIG. 2, the precoding weight $w_{xy}$ is applied to bursts formed from data stream x when transmitted from antenna y, if the antenna 115 is seen as antenna 1 and the antenna 130 is seen as antenna 2. The sets of pre-coding weights which are used are sometimes also referred to as "pre-coding matrices" or simply "pre-coders".

Figure 3:
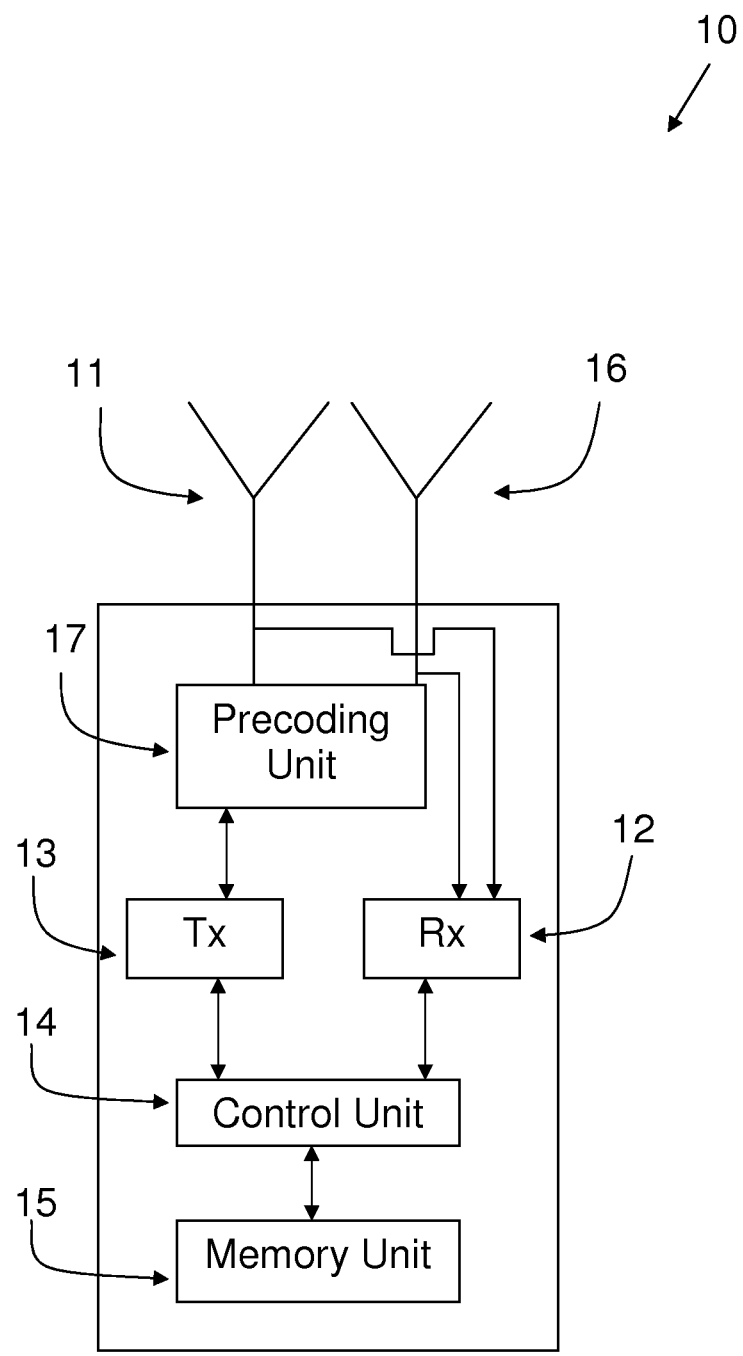
FIG. 3 shows a block diagram of a network node.

FIG. 3 shows a schematic block diagram of a general network node 10, which has the ability to transmit bursts formed from data streams from one or more antennas with or without precoding weights applied to the bursts, i.e. with or without precoding. As shown in FIG. 3, the network node 10 comprises two antenna units 11, 16, with the number of antennas shown in FIG. 3 being an example only; the number can vary from one and upwards to a more or less arbitrary number. Also, suitably, each antenna is used to receive and to transmit, although separate receive and transmit antennas can also be used.

The network node 10 also comprises a precoding unit 17, which functions in the manner described in connection to the precoding unit 140 shown in FIG. 2. In addition, the network node 10 comprises a transmit unit, Tx 13, and a receive unit, Rx 12. The transmit unit 13 is shown as being connected to the precoding unit 17 for reasons which have been described in connection to FIG. 2.

The network node 10 also comprises a control unit 14, which in general controls the overall function of the network node 10, and which also controls the precoding carried out in the unit 13, e.g. by means of controlling that the proper weights $w_{xy}$ are used by the precoding unit 17 for the bursts formed from the different data streams. In addition to the units mentioned, the network node 10 also comprises a memory unit 15, which may be used in order to, for example store the precoding weights $w_{xy}$ or previously received and decoded RLC data blocks.

As mentioned previously, a network node which supports EGPRS and its derivatives, e.g. EGPRS2, is arranged to make transmissions of radio blocks in bursts, at present with four bursts per radio block. Each radio block carries (i.e. transports) one or more RLC data blocks. The RLC data blocks contain "payload", but the network node is also arranged to make transmissions of dummy blocks (i.e. blocks which are empty of payload), as well as so called pre-emptive retransmissions, which are retransmissions of payload RLC data blocks (carried in radio blocks, as mentioned previously) for which no acknowledgement has been received from the party for whom the payload was intended.

In addition to being arranged to make transmissions of "new" payload RLC data blocks ("new" as opposed to retransmissions), dummy blocks and pre-emptive retransmissions, the network node 10 is arranged to make the transmission either as precoded or non-precoded transmissions. In order to enable good SNR for the receiving party and to also enable a good estimate of the precoding weights, i.e. the pre-coding matrices, the network node 10 is arranged to use precoding for a first percentage of the pre-emptive retransmissions and for a second percentage of the transmission of RLC data blocks that have not been transmitted previously, i.e. the "new" RLC data blocks. Either percentage can be larger than the other, or they may be equal, all depending on system requirements, but suitably the first percentage is smaller than the second. This latter case will be beneficial since new transmissions will benefit from the higher SNR given by the pre-coding, and the larger percentage of non-precoding used for the pre-emptive transmissions while increasing the pre-coding matrix estimate, will not have a significantly detrimental impact on the link performance.

Also, as pointed out previously, the first and second percentages mentioned here are percentages of bursts in radio blocks as seen over a large number of radio blocks or over a long period of time.

Figure 4:
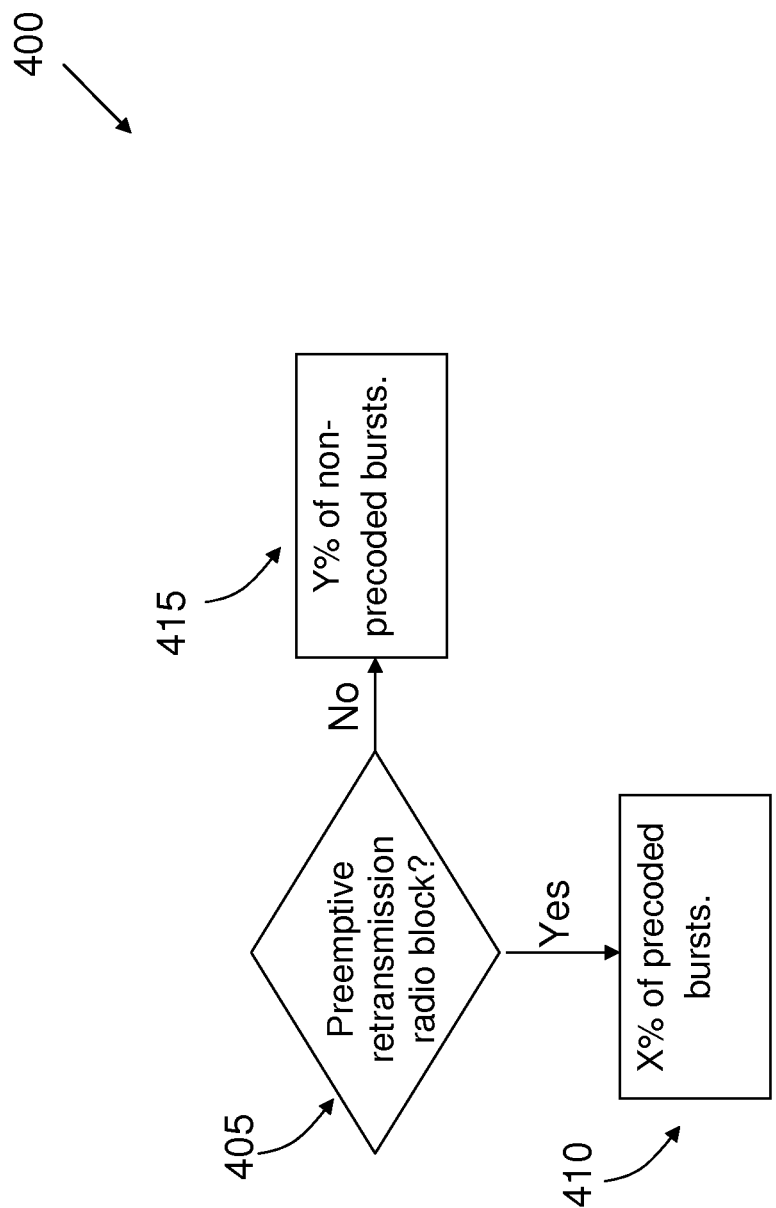
FIG. 4 shows a flow chart for retransmissions and transmissions of bursts of radio blocks that carry RLC data blocks which have not been transmitted previously.

FIG. 4 shows a flowchart of a possible method 400 for use in the network node 10: in step 405, it is checked if an RLC data block for transmission is a pre-emptive retransmission block. If this is the case, then the bursts in the corresponding radio block are transmitted with a first percentage ("X %") of pre-coded bursts. If the check in step 405 shows that the RLC data block for transmission is not a pre-emptive retransmission block, then it is a "new" RLC data block, and as shown in step 415, the bursts in the corresponding radio block are transmitted with a second percentage ("Y %") of pre-coded bursts. The first and second percentages X and Y can be equal, or Y can exceed or be less than Y, all depending on system requirements.

Figure 5:
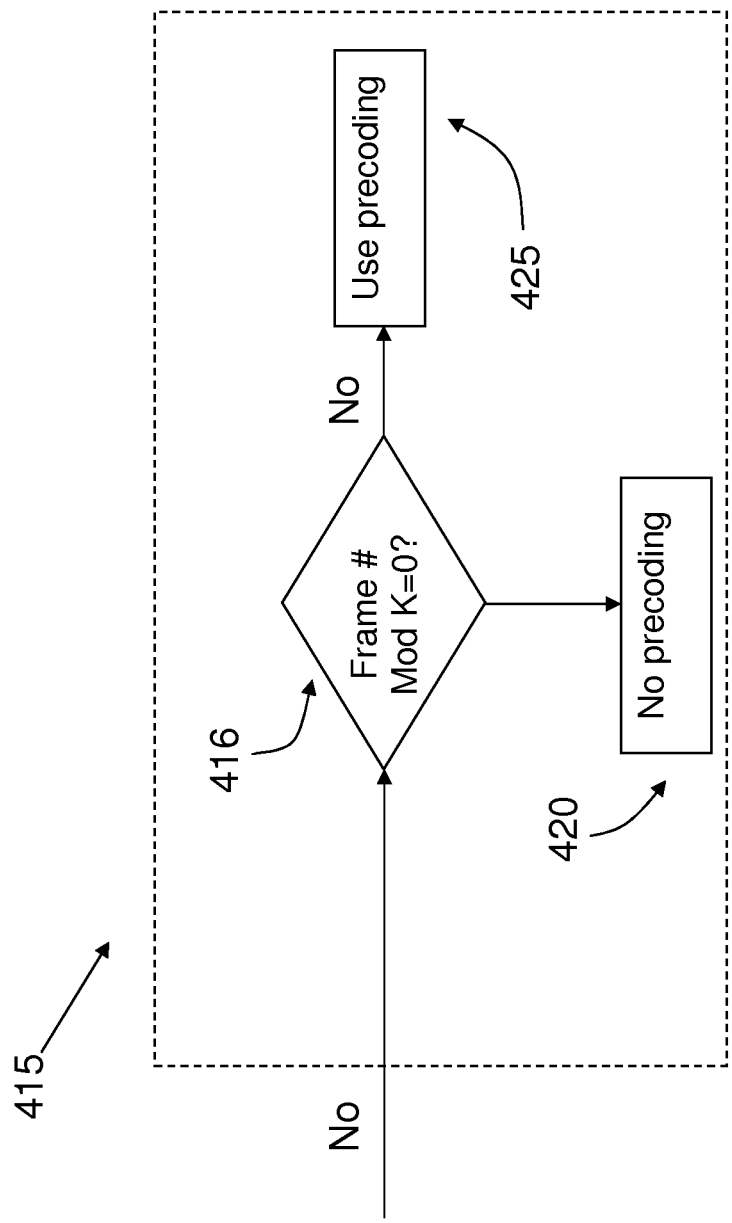
FIG. 5 shows a flow chart for making precoded and non-precoded transmissions.

In FIG. 5, a flow chart of a mechanism for generating the percentages X or Y, in this example the percentage Y of step 415 is shown: as shown, in step 415, a mechanism is entered in which a certain percentage of the transmitted bursts are pre-coded, and another percentage of the transmitted bursts are not pre-coded. This is exemplified as follows: using a predefined integer K, a check, step 416, is performed of whether or not the number of the TDMA frame (usually, one burst is sent per TDMA frame, so one radio block will use four TDMA frames) to which the burst in the radio block belongs equals zero as seen modulo K, i.e. "frame # modulo K=0?". If the answer is yes, then, step 420, the transmission of the burst is performed without precoding, and if the answer is no, then, step 425, the transmission of the burst is made using pre-coding. The percentage of "new" RLC data blocks that is transmitted with/without pre-coding can then be varied by varying the integer K.

Figure 6:
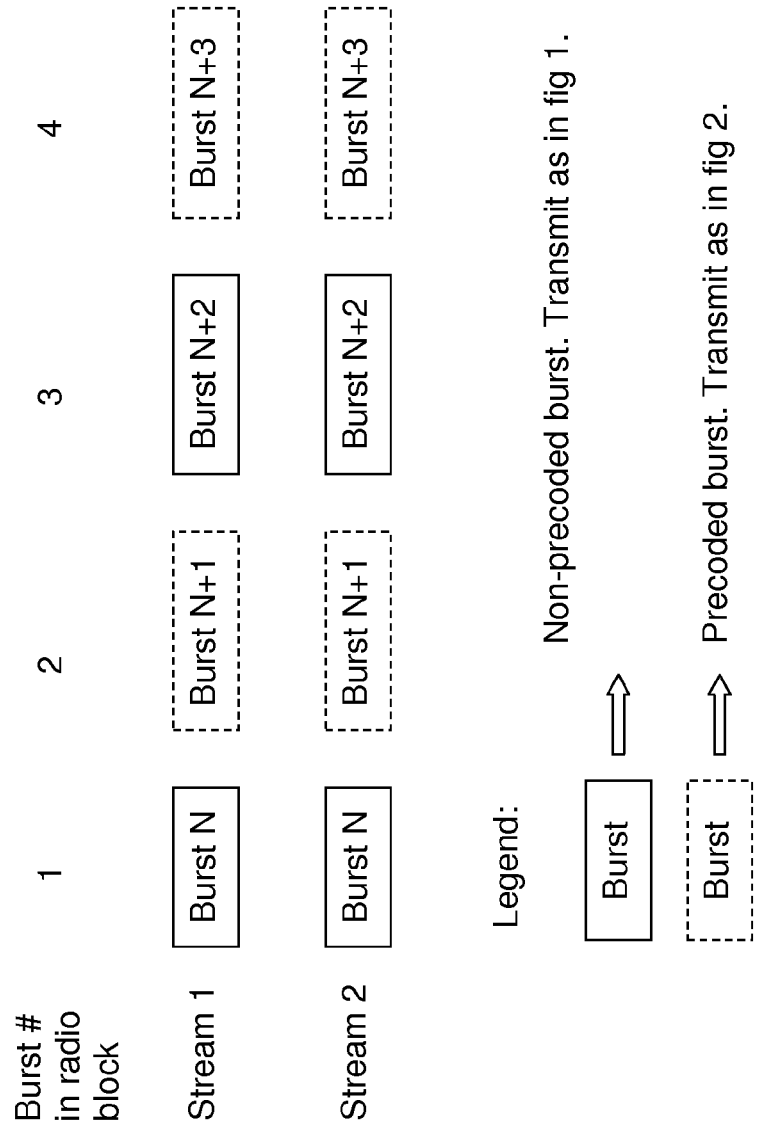
FIG. 6 shows an example of scheduling of preemptive retransmission of bursts of radio blocks which carry RLC data blocks.

FIG. 6 shows an example of how the network node 10 can increase the percentage of pre-coded transmissions of bursts for pre-emptive transmissions of RLC data blocks using the mechanisms described above: in the case of pre-emptive transmissions of RLC data blocks, the network node 10 can choose to increase the number of bursts that are transmitted precoded. In the example given in FIG. 6, every second burst is shown as being pre-coded, but this can also be increased.

In order to also obtain advantages when transmitting dummy blocks, the network node 10 is in embodiments arranged to use a certain percentage of precoding when transmitting dummy blocks. This percentage can apply to bursts within dummy blocks, i.e. either the percentage is counted as a percentage of all bursts over a certain number of dummy blocks, or the percentage is counted as a percentage of all dummy blocks, suitably then over a certain amount of time. In embodiments, the percentage is zero, i.e. in such embodiments no precoding is used for dummy blocks.

Figure 7:
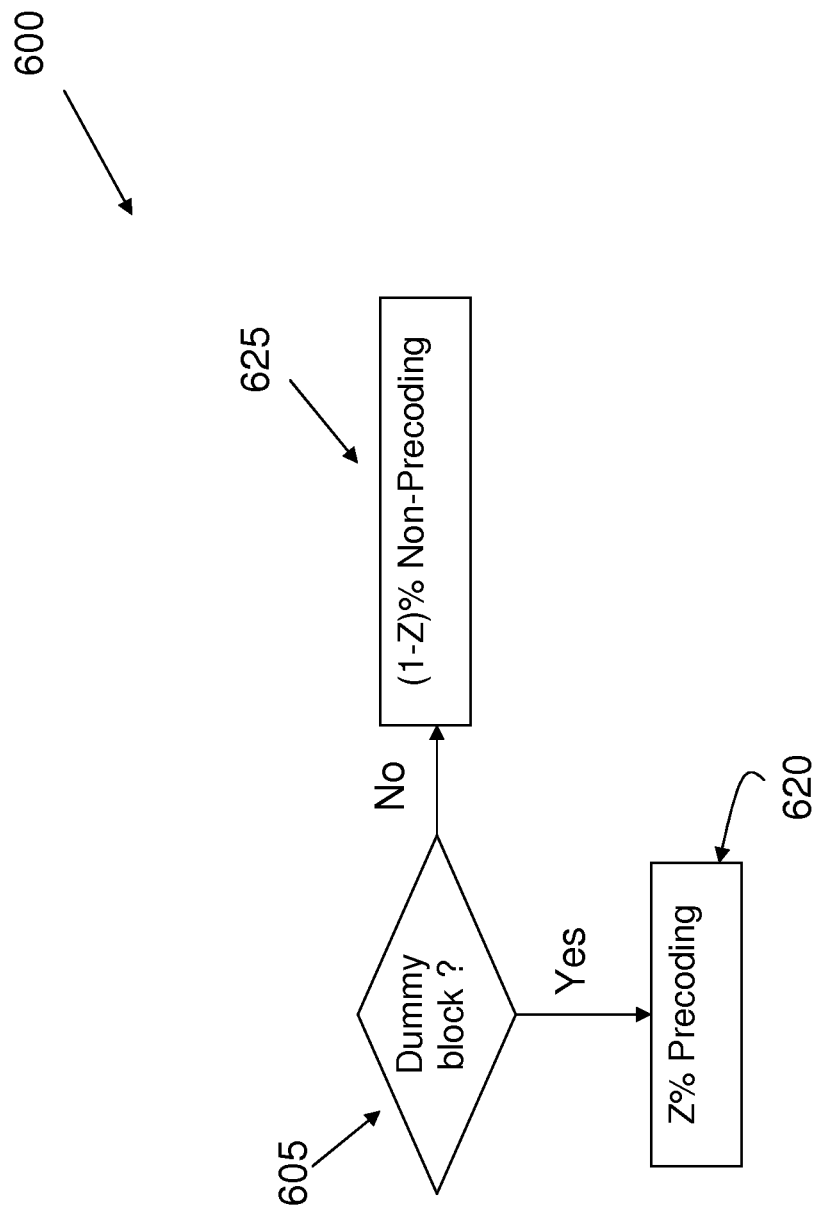
FIG. 7 shows a flow chart for transmissions of dummy blocks.

FIG. 7 shows a flowchart of a method 700 by means of which the percentage for precoding of dummy blocks can be achieved: in step 605, a check is made of whether the block for transmissions (or the block to which the current burst belongs) is a dummy block. If this is the case, then, in step 620, the transmission is made with the certain percentage of precoding for dummy blocks mentioned above, shown as "Z %" in FIG. 6. If the block for transmissions (or the block to which the current burst belongs) is not a dummy block, the transmissions are made with another (as compared to dummy blocks) rate of precoding, suitably determined using the same mechanism as illustrated in FIG. 5.

Figure 8:
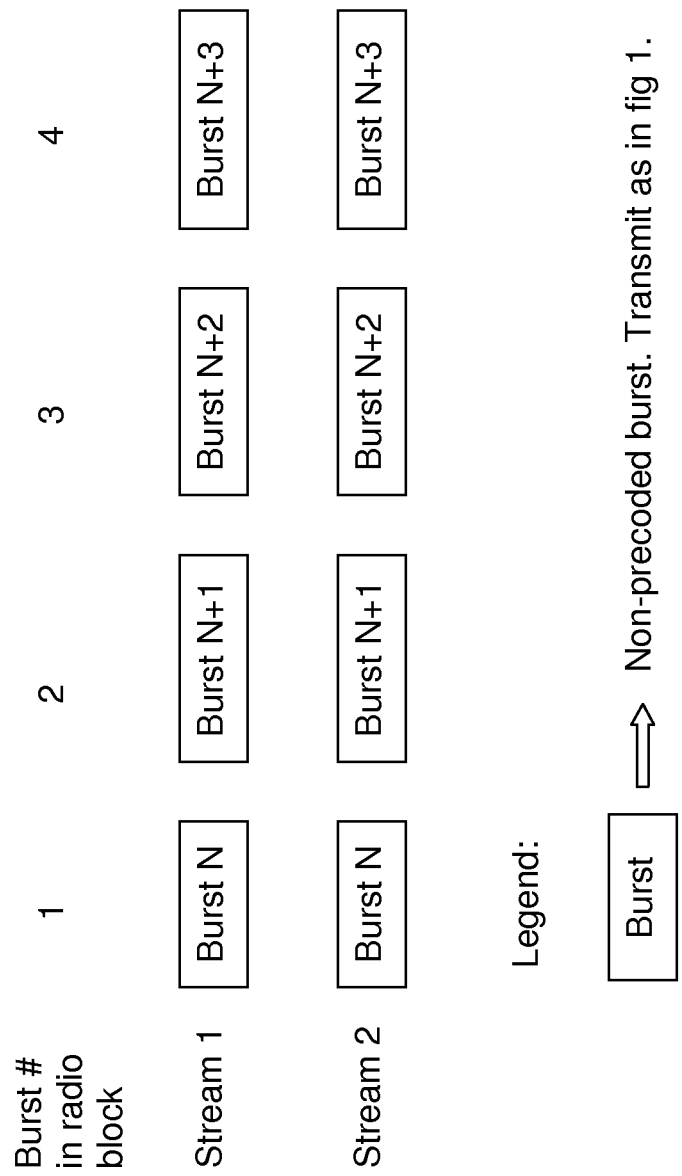
FIG. 8 shows an example of scheduling of transmissions of dummy blocks.

FIG. 8 shows an example of transmissions made by the network node 10 in the case of dummy blocks, where the percentage of precoding used for dummy blocks (i.e. Z in FIG. 7) is set to zero, i.e. Z=0. Thus, with Z set to zero, as shown in FIG. 7, each burst in a dummy block will be transmitted non-precoded, which is true for both of the streams shown in FIG. 8.

Figure 9:
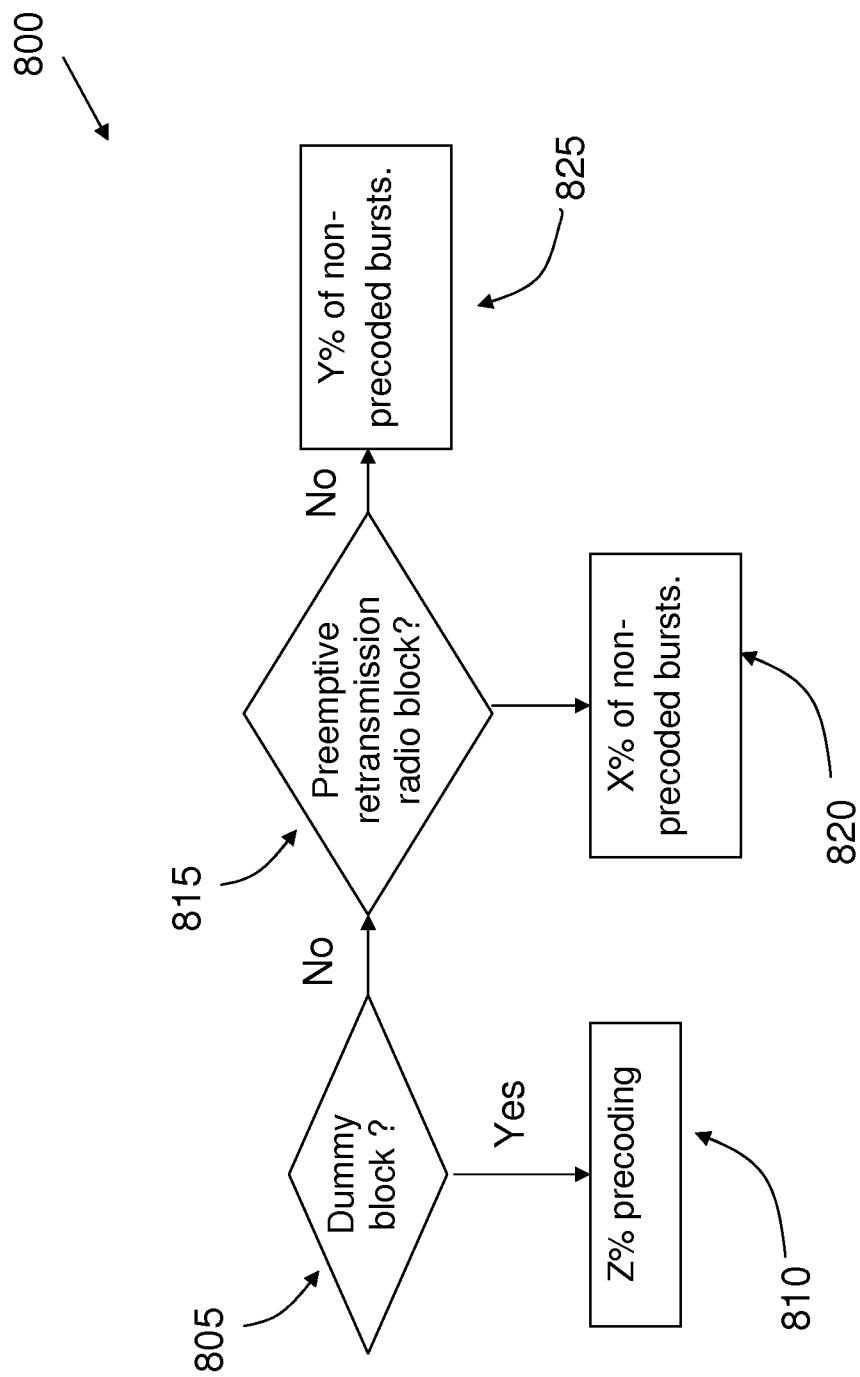
FIG. 9 shows a flow chart for pre-coded transmissions including dummy blocks and bursts of radio blocks which carry pre-emptive retransmissions of RLC Data blocks.

FIG. 9 shows a flowchart of a method 800 for use by the network node 10 when transmitting dummy blocks as well as payload RLC data blocks and making retransmissions of unacknowledged previously transmitted payload RLC data blocks. As shown, in step 805, a check is made of whether or not the radio block for transmission is a dummy block or not. If the block in question is a dummy block, then, step 810, the block is transmitted using a certain percentage, Z %, for precoding, and accordingly, a percentage (1−Z %) for non-precoding. If the block for transmission is not a dummy block, a check is made, step 815, of whether or not the radio block in question carries one or more pre-emptive retransmission RLC data blocks. If that is the case, then, step 820, the number of non-precoded bursts within the radio block is increased as compared to bursts of radio blocks that carry "new" RLC data blocks, using the X % of FIG. 4. If the check in step 815 shows that the radio block in question does not carry a pre-emptive retransmission of an RLC data block, then a mechanism is entered which determines if the bursts within radio block should be transmitted with or without pre-coding, said mechanism suitably being the one shown in FIG. 5.

The network node 10 can also be used as a receiving node, i.e. as a node which receives EGPRS (and derivatives of EGPRS, e.g. EGPRS2) transmissions such as those which have been described above, i.e. dummy blocks, preemptive retransmissions and transmissions of "new" RLC data blocks, said transmissions having been made precoded or non-precoded. In its role as a receiving node, the network node 10 is arranged to detect if a successfully received RLC data block which is received in a non-precoded transmission has been received successfully previously, i.e. if the RLC data block is comprised in a pre-emptive transmission, and if that is the case, to use all or parts of the RLC data block in order to perform a pre-coder estimate.

In order to detect if a received transmission was precoded or not, the network node 10 suitably makes use of information it has received either from the transmitting node or from another node, suitably a controlling node in the system. The information can for example be a pattern which describes when pre-coded and non-precoded transmissions will be made, or a schedule which describes when pre-coded and non-precoded transmissions will be made. Alternatively, or as a complement, the network node 10 is arranged to recognize training-sequences that are used for precoded and/or for non-precoded transmissions.

Turning now to how the network node 10 uses received dummy blocks and pre-emptively transmitted RLC data blocks in order to make pre-coding estimates, this is as follows:

Dummy bursts are standardized, thus enabling the network node 10 to recognize them. Hence, the network node 10 is arranged to recognize dummy bursts and thereby also dummy blocks, since those are comprised of dummy bursts. In addition to this, the network node 10 is arranged to treat one or more dummy burst in a dummy block as a training sequence, thereby enabling the network node to use the one or more dummy bursts to perform a pre-coding estimate.

Regarding the use of received preemptive transmissions in order to make pre-coding estimates, this is as follows:

Assume that one and the same RLC data block is received twice, and is correctly decoded the first time. Each RLC data block has an identifier in the header. The second time the RLC data block is received, the receiver realizes that the same RLC data block has already been received and successfully decoded, since the receiver always reads the header and extracts the identifier.

If the RLC data block has been successfully received, then it is possible for the receiver to know what the data bits (i.e. "user code bits") that modulated the bursts in the block were. Due to this, each received burst can be used as one large training sequence, since all the bits comprised in the bursts are known. (By definition, a regular burst consists of a sequence of tail bits, data bits, training sequence bits, data bits and tail bits, i.e. a training sequence is inserted between data bits.)

Figure 10:
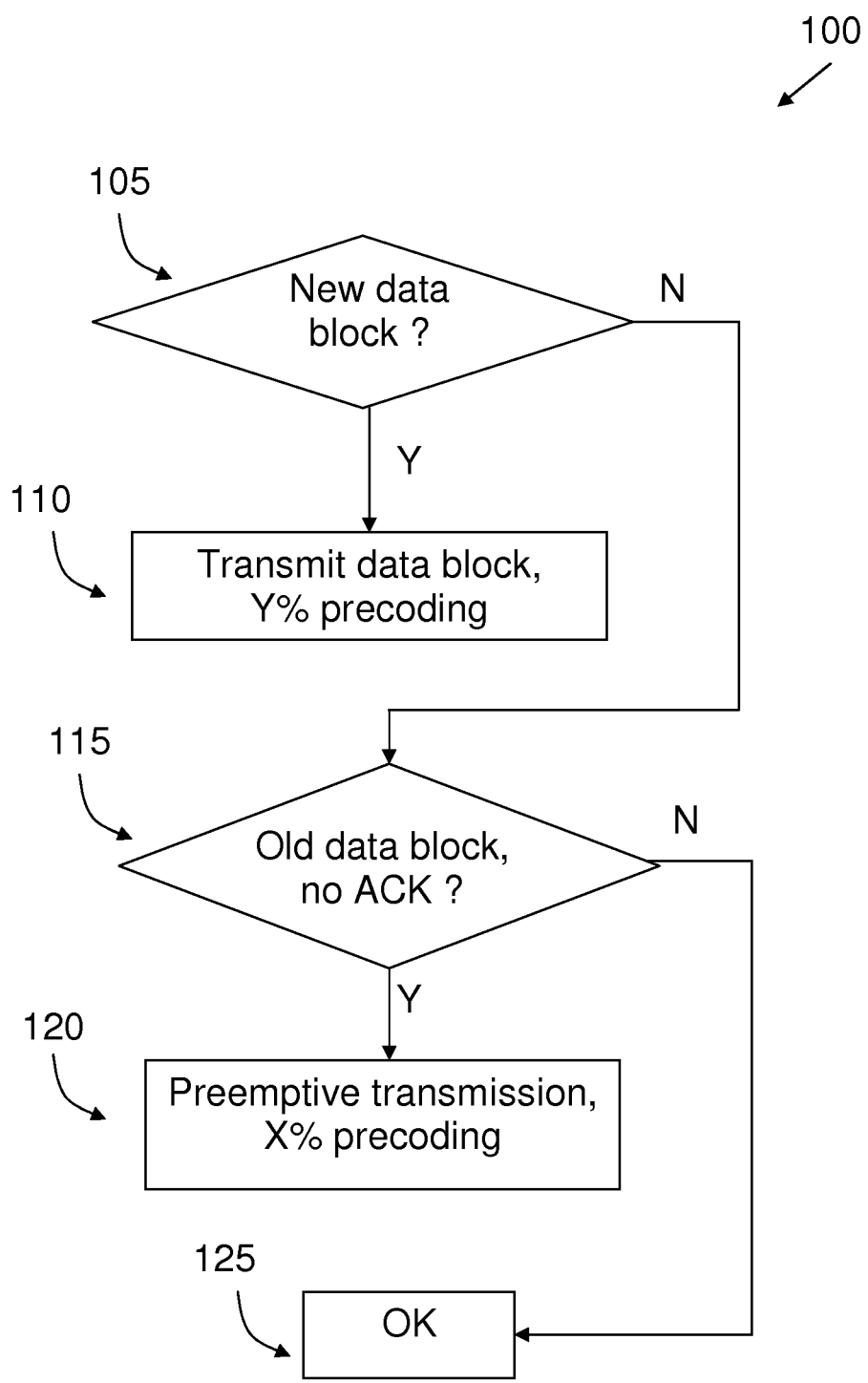
FIGS. 10 and 11 show flow charts of methods for operating a network node.

FIG. 10 shows a flow chart of a method 100 for operating a network node such as the one 10 of FIG. 3, i.e. a network node which supports EGPRS and which is arranged to transmit RLC data blocks to at least one other network node in the EGPRS system and to receive acknowledgments from the other network node for successfully received RLC data blocks. As mentioned previously, the network node can be either a base station or a Mobile Terminal.

The method 100 comprises checking, as shown in steps 105 and 115, if a RLC data block for transmission has been transmitted previously or has been transmitted previously but hasn't been acknowledged, and transmitting, as shown in step 110, RLC data blocks which have not been transmitted previously with a first likelihood (equal to the first percentage mentioned previously) for precoding. As shown in step 120, the method comprises transmitting RLC data blocks which have been transmitted previously but have not been acknowledged as pre-emptive transmissions with a second likelihood (equal to the second percentage mentioned previously) for precoding.

In embodiments, the method 100 further comprises also transmitting dummy blocks to said at least one other node, and using precoding with a third likelihood for the transmission of the dummy blocks.

In embodiments of the method 100, the third likelihood is zero.

As mentioned, the RLC data blocks are carried in radio blocks of a certain number of bursts, and the first and second likelihoods mentioned above should be seen as applying to the transmission of the bursts.

Figure 11:
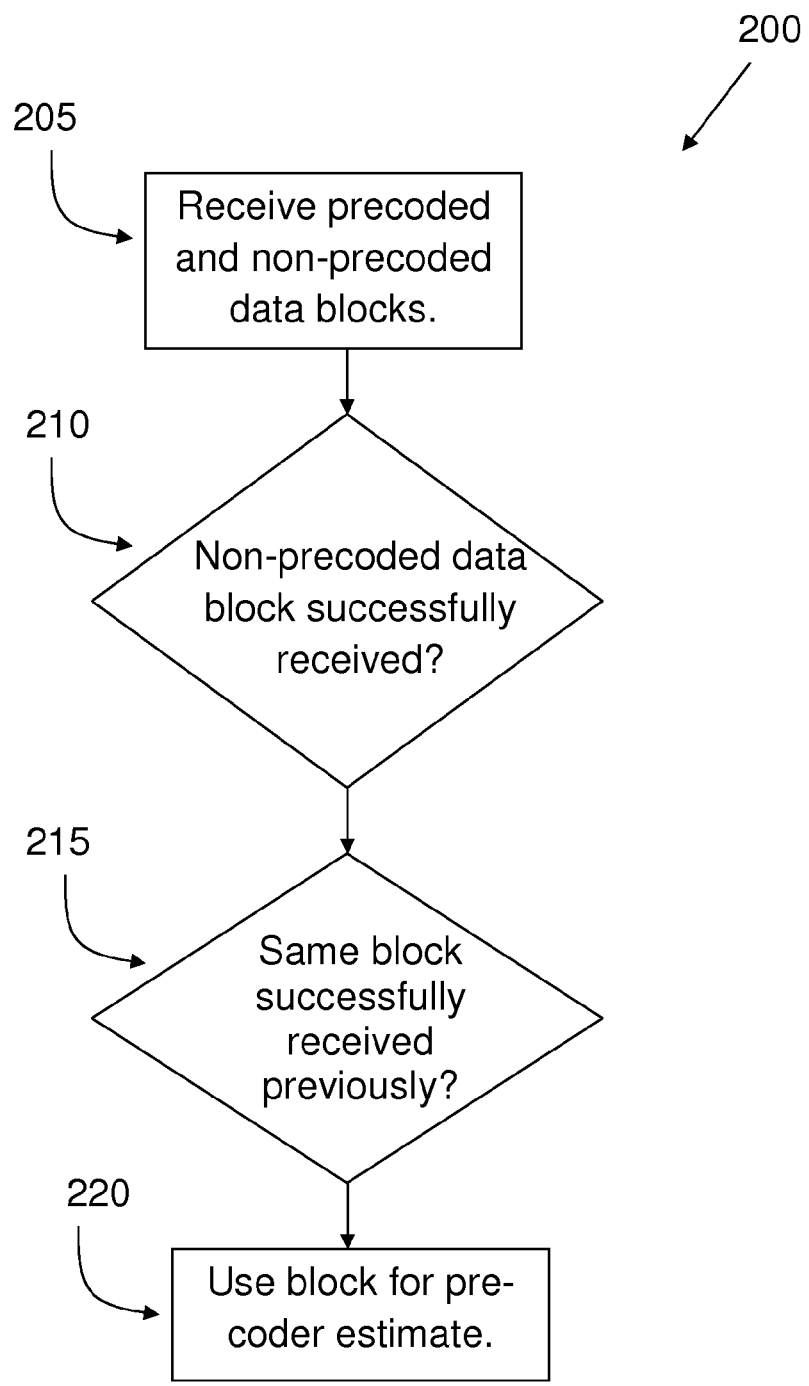

FIG. 11 shows a flow chart of a method 200 for operating a network node (10) which supports EGPRS. As shown in step 205, the method 200 comprises receiving RLC data blocks from another network node in the EGPRS system by means of pre-coded and/or non-precoded transmissions.

As shown in steps 210 and 215, if at least part of a successfully received RLC data block which is received in a non-precoded transmission has been received successfully previously, a pre-coder estimate is performed using all or parts of the RLC data block.

In embodiments, the method 200 further comprises receiving and detecting dummy blocks transmitted by means of precoded and/or non-precoded transmissions from the other network node, and performing pre-coder estimates by means of dummy blocks received in non-precoded transmissions.

In embodiments, the method 200 comprises recognizing if a dummy block or all or parts of an RLC data block has been received in a precoded transmission from the other network node by means of having received from the other network node a pattern indicating when transmissions will be made precoded and/or non-precoded.

In embodiments, the method 200 comprises recognizing if a dummy block or all or parts of an RLC data block has been received in a precoded or a non-precoded transmission from the other network node by means of recognizing training sequences that are used for precoded and/or for non-precoded transmissions.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A network node which supports an Enhanced General Packet Radio Service (EGPRS), the network node being arranged to transmit Radio Link Control (RLC) data blocks to at least one other network node in an EGPRS system and to receive acknowledgments from the other network node for successfully received RLC data blocks, the network node also being arranged to make pre-emptive retransmissions of unacknowledged previously transmitted RLC data blocks, the network node being arranged to make its transmissions with or without precoding, the network node being characterized in that it is arranged to use precoding for a first percentage of the pre-emptive retransmissions and for a second percentage of the transmissions of RLC data blocks that have not been transmitted previously, whereby some of said pre-emptive retransmissions and transmissions of RLC data blocks that have not been transmitted previously will be using said precoding.

2. The network node of claim 1, further being arranged to transmit dummy blocks, which are blocks that are empty of payload, to said at least one other network node, the network node being arranged to use said precoding for the transmission of a predefined percentage of the dummy blocks.

3. The network node of claim 2, in which the predefined percentage is zero.

4. The network node of claim 1, in which the RLC data blocks are carried in radio blocks of a certain number of bursts, and in which the first and second percentages are percentages of the bursts.

5. A network node which supports an Enhanced General Packet Radio Service (EGPRS), the network node being arranged to receive Radio Link Control (RLC) data blocks transmitted from another network node in an EGPRS system as some pre-coded transmissions and some non-precoded transmissions, and to detect if a successfully received RLC data block, at least a part of which is received in a non-precoded transmission has been received successfully previously, and if that is the case, to use all or parts of the RLC data block in order to perform a pre-coder estimate, wherein the network node is further arranged to recognize if a dummy block, which is a block that is empty of payload, or at least a part of an RLC data block has been received in a precoded or a non-precoded transmission from the other network node based on having received from the other network node a pattern indicating when transmissions will be made precoded and/or non-precoded.

6. The network node of claim 5, further being arranged to receive and detect dummy blocks transmitted by means of precoded and/or non-precoded transmissions from the other network node, and to use said dummy blocks received in non-precoded transmissions in order to perform pre-coder estimates.

7. The network node of claim 5, further being arranged to recognize if a dummy block or at least a part of an RLC data block has been received in a precoded or a non-precoded transmission from the other network node by means of being arranged to recognize training-sequences that are used for precoded and/or for non-precoded transmissions.

8. The network node of claim 5, further being arranged to receive said RLC data blocks in radio blocks which are transmitted in a certain number of bursts.

9. A method for operating a network node which supports an Enhanced General Packet Radio Service (EGPRS) and which is arranged to transmit Radio Link Control (RLC) data blocks to at least one other network node in an EGPRS system and to receive acknowledgments from the other network node for successfully received RLC data blocks, the method comprising checking if an RLC data block for transmission has been transmitted previously or has been transmitted previously but has not been acknowledged, and transmitting RLC data blocks which have not been transmitted previously with a first likelihood for precoding, and transmitting RLC data blocks which have been transmitted previously but have not been acknowledged as pre-emptive transmissions, with a second likelihood for precoding, whereby some of the transmissions of RLC data blocks that have been and have not been transmitted previously will be transmitted with said precoding.

10. The method of claim 9, further comprising transmitting dummy blocks, which are blocks that are empty of payload, to said at least one other network node, and using precoding with a third predefined likelihood for the transmission of the dummy blocks.

11. The method of claim 10, according to which the third predefined likelihood is zero.

12. The method of claim 9, according to which the RLC data blocks are transmitted in radio blocks of a certain number of bursts, and the first and second likelihoods are applied to the transmission of the bursts.

13. A method for operating a network node which supports an Enhanced General Packet Radio Service (EGPRS), the method comprising receiving receive Radio Link Control (RLC) data blocks from another network node in an EGPRS system as some pre-coded transmission and/or and some non-precoded transmissions, and detecting if a successfully received RLC data block, at least part of which is received in a non-precoded transmission, has been received successfully previously, and if that is the case, performing a pre-coder estimate using all or parts of the RLC data block, the method further comprising recognizing if a dummy block, which is a block that is empty of payload, or all or parts of an RLC data block has been received in a precoded transmission from the other network node based on having received from the other network node a pattern indicating when transmissions will be made precoded and/or non-precoded.

14. The method of claim 13, further comprising receiving and detecting dummy blocks transmitted by means of precoded and/or non-precoded transmissions from the other network node, and performing pre-coder estimates by means of dummy blocks received in non-precoded transmissions.

15. The method of claim 13, further comprising recognizing if a dummy block or a RLC data block has been received in a precoded or a non-precoded transmission from the other network node by means of recognizing training-sequences that are used for precoded and/or for non-precoded transmissions.

16. The network node of claim 1, wherein the first percentage is less than the second percentage.

17. The network node of claim 1, wherein the first percentage equals the second percentage.

* * * * *